United States Patent
Giles et al.

(10) Patent No.: US 10,000,117 B2
(45) Date of Patent: Jun. 19, 2018

(54) FILLER NECK CLOSURE ASSEMBLY

(71) Applicant: Stant USA Corp., Connersville, IN (US)

(72) Inventors: David A. Giles, Connversville, IN (US); Michael S. Brock, Connersville, IN (US); Kevin L. Young, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days. days.

(21) Appl. No.: 15/412,444

(22) Filed: Jan. 23, 2017

(65) Prior Publication Data

US 2017/0158048 A1 Jun. 8, 2017

Related U.S. Application Data

(60) Provisional application No. 62/286,137, filed on Jan. 22, 2016.

(51) Int. Cl.
*B60K 15/04* (2006.01)
*B67D 7/42* (2010.01)

(52) U.S. Cl.
CPC ............... *B60K 15/04* (2013.01); *B67D 7/42* (2013.01); *B60K 2015/0461* (2013.01); *B60K 2015/0477* (2013.01)

(58) Field of Classification Search
CPC ............ B60K 15/04; B60K 2015/0461; B60K 2015/0477; B67D 7/42
USPC .......................................................... 701/36
See application file for complete search history.

(56) References Cited

U.S. PATENT DOCUMENTS

| 765,493 | A | | 7/1904 | Koscinski |
| 2,145,758 | A | | 1/1939 | Fellows et al. |
| 2,206,948 | A | | 7/1940 | Frankford |
| 3,133,741 | A | | 5/1964 | Garabello |
| 3,481,506 | A | | 12/1969 | Ihlenfeld et al. |
| 3,730,216 | A | | 5/1973 | Arnett et al. |
| 4,034,784 | A | | 7/1977 | Ball et al. |
| 4,248,279 | A | | 2/1981 | Warmbold |
| 4,526,216 | A | | 7/1985 | Lake, Jr. |
| 4,687,034 | A | | 8/1987 | Graiff et al. |
| 5,056,570 | A | * | 10/1991 | Harris .............. B60K 15/03519 |
| | | | | 141/302 |
| 5,145,081 | A | | 9/1992 | Gravino |
| 5,212,864 | A | | 5/1993 | Bates et al. |
| 5,271,438 | A | * | 12/1993 | Griffin ................... B60K 15/04 |
| | | | | 141/302 |

(Continued)

FOREIGN PATENT DOCUMENTS

| DE | 1712398 U | 12/1955 |
| DE | 4039269 C1 | 2/1992 |

(Continued)

OTHER PUBLICATIONS

US 8,511,353, 08/2013, Hagano (withdrawn)

*Primary Examiner* — Tyler J Lee
(74) *Attorney, Agent, or Firm* — Barnes & Thornburg LLP

(57) ABSTRACT

A capless filler neck closure for use with a vehicle fuel tank filler neck is disclosed. The capless filler neck closure includes an outer dust cover and an inner closure door each movable from a closed position to an opened position in response to insertion of a fuel nozzle into the capless filler neck closure for refueling of an associated vehicle fuel tank.

19 Claims, 6 Drawing Sheets

(56) References Cited

U.S. PATENT DOCUMENTS

| | | |
|---|---|---|
| 5,322,100 A | 6/1994 | Buechler et al. |
| 5,385,179 A | 1/1995 | Bates et al. |
| 5,439,129 A | 8/1995 | Buechler |
| 5,465,861 A | 11/1995 | Kunz et al. |
| 5,715,963 A | 2/1998 | Boll et al. |
| 5,730,194 A * | 3/1998 | Foltz .............. B60K 15/04 137/588 |
| 5,732,840 A * | 3/1998 | Foltz .............. B60K 15/04 141/325 |
| 5,732,842 A | 3/1998 | Krause et al. |
| 5,738,359 A | 4/1998 | Gundy |
| 6,009,920 A | 1/2000 | Palvoelgyi et al. |
| 6,092,685 A | 7/2000 | Gruber |
| 6,152,455 A | 11/2000 | Brockway et al. |
| 6,155,316 A | 12/2000 | Benjey |
| 6,279,626 B1 | 8/2001 | Schmitt et al. |
| 6,302,169 B1 | 10/2001 | Pulos |
| 6,325,233 B1 | 12/2001 | Harris |
| 6,382,270 B1 | 5/2002 | Gzik |
| RE37,776 E | 7/2002 | Foltz |
| 6,539,990 B1 | 4/2003 | Levey et al. |
| 6,607,014 B2 | 8/2003 | Webb |
| 6,871,677 B2 | 3/2005 | Zerangue, Sr. |
| 6,923,224 B1 * | 8/2005 | McClung .............. B60K 15/035 141/350 |
| 6,968,874 B1 * | 11/2005 | Gabbey .............. B60K 15/04 141/348 |
| 6,983,773 B1 | 1/2006 | Hagano et al. |
| 6,994,130 B1 | 2/2006 | Gabbey et al. |
| 7,011,121 B2 | 3/2006 | Bar et al. |
| 7,077,178 B2 | 7/2006 | Hedevang |
| 7,163,037 B2 | 1/2007 | Walkowski |
| 7,165,583 B1 | 1/2007 | Walkowski et al. |
| 7,182,111 B2 | 2/2007 | McClung et al. |
| 7,293,586 B2 | 11/2007 | Groom et al. |
| 7,302,977 B2 | 12/2007 | King et al. |
| 7,461,673 B2 | 12/2008 | Busch et al. |
| 7,621,303 B2 | 11/2009 | Buchgraber |
| 7,640,954 B2 | 1/2010 | Bar |
| 7,661,550 B2 | 2/2010 | Feichtinger |
| 7,665,493 B2 | 2/2010 | Groom et al. |
| 7,708,036 B2 | 5/2010 | Bar |
| 7,721,775 B2 | 5/2010 | Pozgainer |
| 7,789,113 B2 | 9/2010 | Stephan et al. |
| 7,950,425 B2 | 5/2011 | Och |
| 7,967,041 B2 | 6/2011 | Groom et al. |
| 7,967,042 B2 | 6/2011 | Groom et al. |
| 7,967,361 B2 | 6/2011 | Scott et al. |
| 8,186,394 B2 | 5/2012 | Nourdine et al. |
| 8,191,588 B2 | 6/2012 | Hagano |
| 8,281,825 B2 | 10/2012 | Yoshida |
| 8,430,140 B2 | 4/2013 | Ognjanovski et al. |
| 8,539,993 B2 | 8/2013 | Hagano |
| 8,555,937 B2 | 10/2013 | Murabayashi et al. |
| 8,567,458 B2 | 10/2013 | Sato et al. |
| 8,596,315 B2 | 12/2013 | Muller |
| 8,714,213 B2 | 5/2014 | Girgenrath |
| 8,714,214 B2 | 5/2014 | Cisternino |
| 8,726,950 B2 | 5/2014 | Miller et al. |
| 8,763,656 B2 | 7/2014 | Ichimaru et al. |
| 8,800,611 B2 | 8/2014 | Tsiberidis |
| 8,863,792 B2 | 10/2014 | Kataoka et al. |
| 8,910,678 B2 | 12/2014 | Cisternino et al. |
| 8,944,122 B2 | 2/2015 | Pfohl |
| 8,978,913 B2 | 3/2015 | Walser et al. |
| 8,978,914 B2 | 3/2015 | Kataoka et al. |
| 9,067,487 B2 | 6/2015 | Zia |
| 9,067,488 B2 | 6/2015 | Ryu et al. |
| 9,174,530 B2 | 11/2015 | Hagano |
| 9,205,736 B2 | 12/2015 | Washio et al. |
| 9,234,602 B2 | 1/2016 | Hagano et al. |
| 9,266,428 B2 | 2/2016 | Kobayashi |
| 9,272,616 B2 | 3/2016 | Breuer et al. |
| 9,272,617 B2 | 3/2016 | Ryu et al. |
| RE46,009 E | 5/2016 | Groom et al. |
| 9,415,679 B2 | 8/2016 | Frank et al. |
| 9,505,302 B2 | 11/2016 | Yoshida et al. |
| 9,522,593 B2 | 12/2016 | Kim et al. |
| 9,597,955 B2 | 3/2017 | Ushigome et al. |
| 9,701,194 B2 | 7/2017 | Groom |
| 9,783,047 B2 | 10/2017 | Hendler et al. |
| 9,821,652 B2 | 11/2017 | Hirohara |
| 2002/0020465 A1 | 2/2002 | Gzik |
| 2002/0170622 A1 | 11/2002 | Webb |
| 2004/0025967 A1 | 2/2004 | Henry |
| 2005/0000592 A1 | 1/2005 | Bartlett |
| 2006/0032552 A1 | 2/2006 | Hedevang |
| 2006/0096662 A1 | 5/2006 | King et al. |
| 2006/0237472 A1 | 10/2006 | Martin et al. |
| 2006/0289083 A1 | 12/2006 | Bar |
| 2006/0289084 A1 | 12/2006 | Groom et al. |
| 2007/0000571 A1 | 1/2007 | Jones et al. |
| 2007/0000574 A1 | 1/2007 | DeCapua et al. |
| 2007/0018131 A1 | 1/2007 | Bar |
| 2007/0034287 A1 | 2/2007 | Groom et al. |
| 2007/0251598 A1 | 11/2007 | Nakazawa et al. |
| 2007/0261742 A1 | 11/2007 | Pozgainer |
| 2007/0267099 A1 | 11/2007 | Stephan et al. |
| 2008/0041492 A1 | 2/2008 | Gabbey et al. |
| 2008/0087354 A1 | 4/2008 | Cisternino et al. |
| 2008/0092986 A1 | 4/2008 | Buchgraber |
| 2008/0178962 A1 | 7/2008 | Baudoux et al. |
| 2008/0230147 A1 | 9/2008 | Baudoux et al. |
| 2008/0236685 A1 | 10/2008 | Nourdine et al. |
| 2008/0237230 A1 | 10/2008 | Och |
| 2008/0237231 A1 | 10/2008 | Feichtinger |
| 2009/0020182 A1 | 1/2009 | Groom et al. |
| 2009/0056831 A1 | 3/2009 | Journee |
| 2009/0095373 A1 | 4/2009 | Correira et al. |
| 2009/0145516 A1 | 6/2009 | Wells et al. |
| 2009/0145899 A1 | 6/2009 | Benjey et al. |
| 2009/0165891 A1 | 7/2009 | Candelise |
| 2009/0188582 A1 | 7/2009 | Hagano et al. |
| 2009/0217503 A1 | 9/2009 | Scott et al. |
| 2010/0006178 A1 | 1/2010 | Muth et al. |
| 2010/0012223 A1 | 1/2010 | Yoshida |
| 2010/0132838 A1 | 6/2010 | Cisternino et al. |
| 2010/0133274 A1 | 6/2010 | Hagano |
| 2010/0175785 A1 | 7/2010 | Groom et al. |
| 2010/0212780 A1 | 8/2010 | Sato et al. |
| 2010/0218849 A1 | 9/2010 | Hagano |
| 2011/0017349 A1 | 1/2011 | Cartwright |
| 2011/0079322 A1 | 4/2011 | Beier et al. |
| 2011/0100985 A1 | 5/2011 | Tsiberidis |
| 2011/0132905 A1 | 6/2011 | Ognjanovski et al. |
| 2011/0132906 A1 | 6/2011 | Miller et al. |
| 2011/0139779 A1 | 6/2011 | Muller |
| 2011/0162754 A1 | 7/2011 | Murabayashi et al. |
| 2011/0180176 A1 | 7/2011 | Girgenrath |
| 2011/0214783 A1 | 9/2011 | Ichimaru et al. |
| 2011/0240640 A1 | 10/2011 | Hagano |
| 2012/0024422 A1 | 2/2012 | Cisternino |
| 2012/0211489 A1 | 8/2012 | Walser et al. |
| 2012/0279612 A1 | 11/2012 | Washio et al. |
| 2012/0285579 A1 | 11/2012 | Dudley et al. |
| 2012/0312420 A1 | 12/2012 | Kataoka et al. |
| 2013/0001226 A1 | 1/2013 | Breuer et al. |
| 2013/0075399 A1 | 3/2013 | Hagano |
| 2013/0233445 A1 | 9/2013 | Pfohl |
| 2013/0319572 A1 | 12/2013 | Zweifel |
| 2013/0327768 A1 | 12/2013 | Kataoka et al. |
| 2014/0332529 A1 | 11/2014 | Ryu et al. |
| 2014/0332530 A1 | 11/2014 | Groom |
| 2014/0352846 A1 | 12/2014 | Ryu et al. |
| 2015/0001216 A1 | 1/2015 | Ushigome et al. |
| 2015/0102031 A1 | 4/2015 | Yoshida et al. |
| 2015/0158380 A1 | 6/2015 | Kim et al. |
| 2015/0298541 A1 * | 10/2015 | Bar .................. B60K 15/03519 220/86.2 |
| 2016/0009173 A1 | 1/2016 | Sperando et al. |
| 2016/0031317 A1 | 2/2016 | Giles et al. |
| 2016/0152133 A1 | 6/2016 | Hendler et al. |
| 2016/0221435 A1 | 8/2016 | Kerin, Jr. et al. |
| 2016/0297297 A1 | 10/2016 | Hirohara |

(56) References Cited

U.S. PATENT DOCUMENTS

| | | |
|---|---|---|
| 2016/0318389 A1 | 11/2016 | Sperando et al. |
| 2017/0028841 A1 | 2/2017 | Sasaki |
| 2017/0260932 A1 | 9/2017 | Brock et al. |

FOREIGN PATENT DOCUMENTS

| | | |
|---|---|---|
| DE | 10139665 A1 | 2/2003 |
| DE | 10157090 C1 | 4/2003 |
| DE | 102004002994 B3 | 9/2005 |
| DE | 102013114804 A1 | 3/2015 |
| DE | 102014012704 A1 | 3/2015 |
| DE | 102014111179 A1 | 6/2015 |
| EP | 1262355 A1 | 12/2002 |
| EP | 1262356 A1 | 12/2002 |
| EP | 1284212 A1 | 2/2003 |
| EP | 1319545 A1 | 6/2003 |
| EP | 1555154 A1 | 7/2005 |
| EP | 1712398 A1 | 10/2006 |
| EP | 1974976 A1 | 10/2008 |
| EP | 2181009 B1 | 6/2012 |
| FR | 2741014 A1 | 5/1997 |
| FR | 2761934 A1 | 10/1998 |
| FR | 2762807 A1 | 11/1998 |
| FR | 2917341 A1 | 12/2008 |
| GB | 2230765 A | 10/1990 |
| JP | 2007261492 A | 10/2007 |
| JP | 2009096215 A | 5/2009 |
| JP | 2015063294 A | 4/2015 |
| JP | 6213412 B2 | 10/2017 |
| KR | 2007012633 A | 1/2007 |
| KR | 1578514 B1 | 12/2015 |
| WO | 1994000351 A1 | 1/1994 |
| WO | 2005077698 A1 | 8/2005 |
| WO | 2009012197 A2 | 1/2009 |
| WO | 2010021829 A1 | 2/2010 |
| WO | 2010026502 A1 | 3/2010 |
| WO | 2014153498 A1 | 9/2014 |
| WO | 2016022447 A1 | 2/2016 |

\* cited by examiner

FILLER NECK CLOSURE ASSEMBLY

PRIORITY CLAIM

This application claims priority under 35 U.S.C. § 119(e) to U.S. Provisional Application Ser. No. 62/286,137, filed Jan. 22, 2016, which is expressly incorporated by reference herein.

BACKGROUND

The present disclosure relates to a filler neck closure system for a fuel tank, and particularly to a filler neck closure for use with a vehicle fuel tank filler neck. More particularly, the present disclosure relates to a capless filler neck closure for a fuel tank filler neck.

SUMMARY

According to the present disclosure, a filler neck closure assembly includes a nozzle-receiving housing associated with a vehicle fuel tank filler neck. The nozzle-receiving housing is formed to include a nozzle-receiving passageway sized to receive the tip of a fuel-dispensing pump nozzle therein during refueling of the fuel tank.

In illustrative embodiments, the filler neck closure assembly is capless and coupled to an outer end of the filler neck. The filler neck closure assembly and filler neck cooperate to define a fill tube for conducting liquid fuel from a nozzle to a fuel tank onboard a vehicle. A movable outer dust shield normally closes an outer nozzle receiver included in the nozzle-receiving housing and a movable inner closure door normally closes an inner nozzle receiver included in the nozzle-receiving housing. The movable inner closure door is arranged to open into a fuel-conducting passageway formed in the filler neck.

In illustrative embodiments, a vacuum latch is adapted to prevent opening of the inner closure door due to vacuum forces in the filler neck. The vacuum latch is configured to move from a normally locked configuration, blocking opening of the inner closure door, to an unlocked configuration, allowing opening of the inner closure door when a fuel-dispensing pump nozzle is inserted into the nozzle-receiving housing for refueling of the fuel tank.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
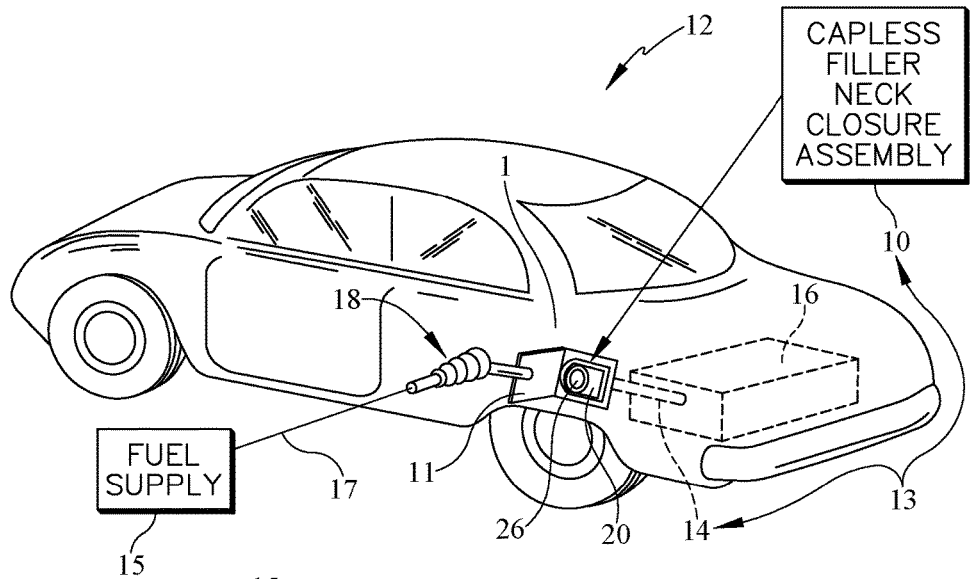
FIG. 1 is a perspective view of a vehicle showing an outer filler neck access door moved to an opened position relative to a vehicle body panel to expose a capless filler neck closure assembly that is coupled to a filler neck to define a fill tube leading to a vehicle fuel tank and showing a fuel-dispensing pump nozzle about to be inserted into the filler neck closure assembly during vehicle refueling to discharge liquid fuel into the filler neck leading to the vehicle fuel tank.

A filler neck closure assembly 10 is provided in a vehicle 12 to close a filler neck 14 extending from a fuel tank 16 onboard the vehicle 12 and to accept a fuel-dispensing pump nozzle 18 during fuel tank refueling as suggested in FIG. 1. Filler neck closure assembly 10 cooperates with filler neck 14 to define a fill tube 13 for conducting liquid fuel 18L from nozzle 18 to fuel tank 16.

Filler neck closure assembly 10 is configured to close off filler neck 14 from atmosphere 101 until fuel-dispensing pump nozzle 18 is inserted into assembly 10 as suggested in FIGS. 3-8. Filler neck closure assembly 10 includes a nozzle-receiving housing 20 coupled to an outer end of filler neck 14 as suggested in FIGS. 1-8. Filler neck closure assembly 10 also includes an outer dust cover 21 and an inner closure door 22 as shown in FIGS. 3-8. A vacuum latch 24 included in filler neck closure assembly 10 is configured to lock inner closure door 22 closed when fuel tank 16 is not being refueled and is arranged to be contacted by fuel-dispensing pump nozzle 18 moving into filler neck closure assembly 10 to unlock vacuum latch 24 allowing inner closure door 22 to open allowing refueling of fuel tank 16 as suggested in FIGS. 7 and 8.

Figures 3, 4:
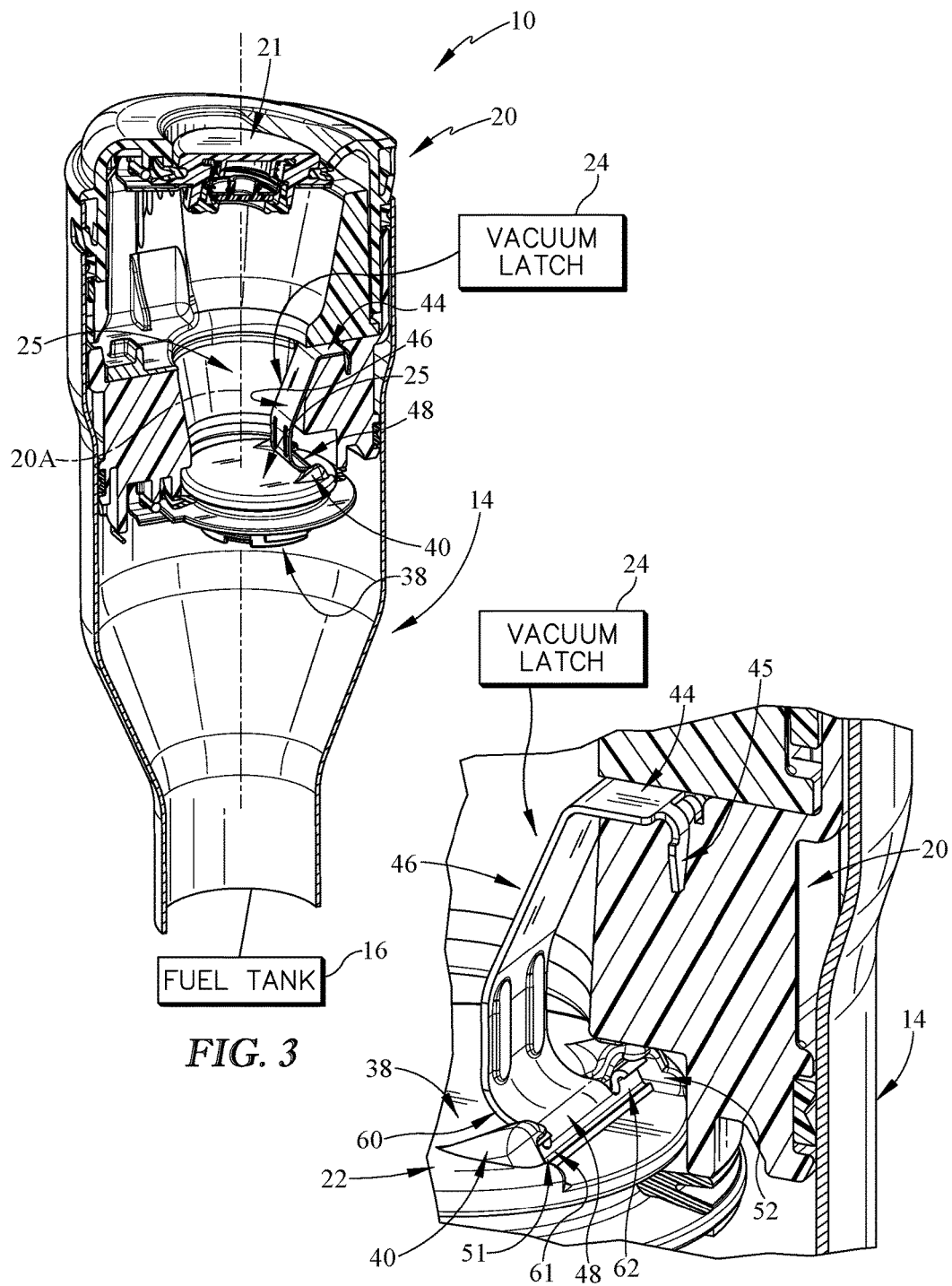
FIG. 3 is a perspective view of an illustrative capless filler neck closure assembly mounted in a filler neck to form a fill tube cut away to show that the capless filler neck closure assembly includes a nozzle-receiving housing, an outer dust cover coupled to the nozzle-receiving housing to pivot from a closed position to an opened position, an inner closure door coupled to the nozzle-receiving housing to pivot from a closed position to an opened position, and a vacuum latch configured to block opening of the inner closure door under vacuum pressure that may be applied by a fuel vapor control system unless a fuel-dispensing pump nozzle is inserted into the nozzle-receiving housing.
FIG. 4 is a detail perspective view of the vacuum latch of FIG. 3 showing the vacuum latch coupled to the nozzle-receiving housing and engaged with the inner closure door to block opening of the inner closure door under vacuum pressure that may be applied by a fuel vapor control system onto the inner closure door.

Vacuum latch 24 is configured to block movement of inner closure door 22 from opening in response to vacuum forces built up in filler neck 14 when a fuel-dispensing pump nozzle (i.e. 18) is not inserted into filler neck closure assembly 10 as suggested in FIGS. 3 and 4. In an illustrative example, during operation of an engine 100 supplied by fuel tank 16, a vacuum force may be applied to filler neck 14 through a fuel vapor control system 110 and through the fuel tank 16. The vacuum force may be used to carry hydrocarbons entrained in a carbon bed 115 housed in a fuel vapor recovery canister 112 toward engine 100 to be burned with other fuel.

Figure 2:
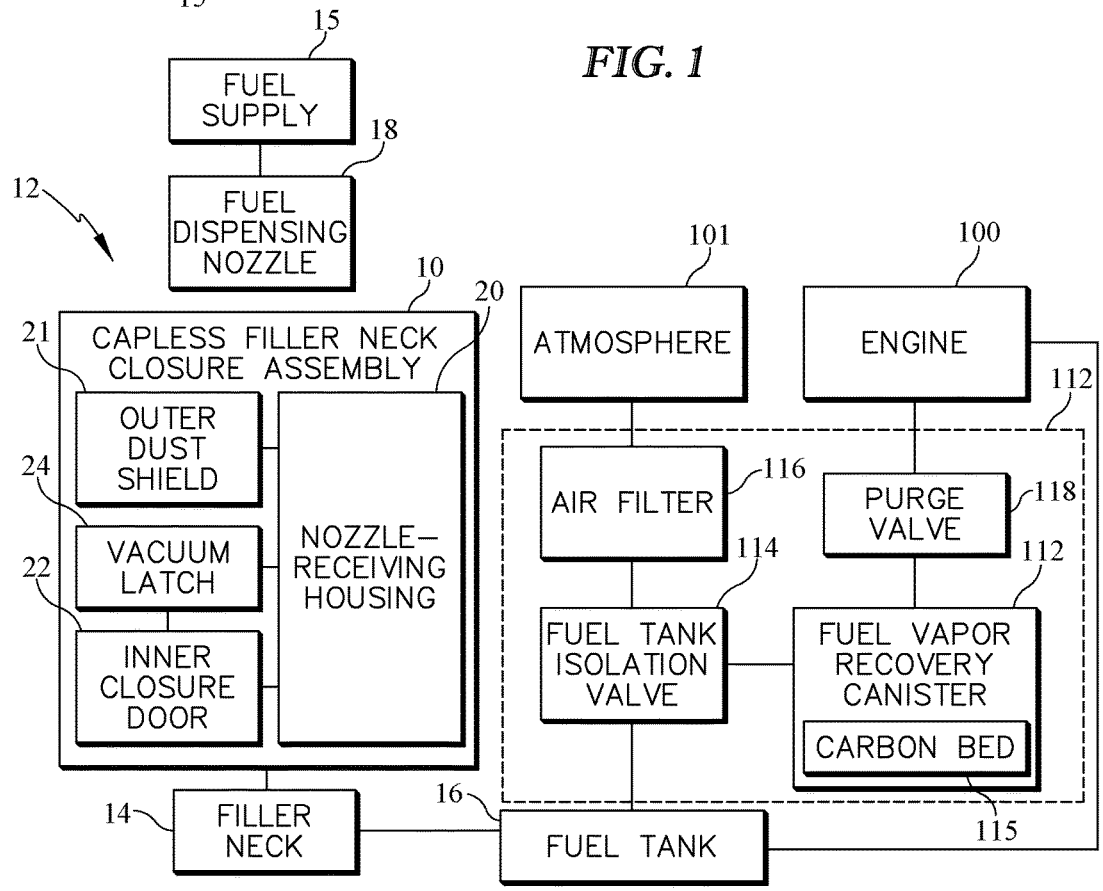
FIG. 2 is a diagrammatic view of a vehicle fuel management system of the type suggested in FIG. 1 showing that the capless filler neck closure assembly includes a vacuum latch adapted to block opening of an inner closure door included in the capless filler neck closure assembly until a fuel-dispensing pump nozzle is inserted into the capless filler neck closure assembly and showing that the fuel management system further includes a fuel vapor control system adapted to vent fuel vapor from the fuel tank and capture hydrocarbons entrained in the vapor before discharging the cleaned vapor to atmosphere.

Vehicle 12 illustratively includes fill tube 13, fuel tank 16, engine 100, and fuel vapor control system 110 as shown diagrammatically in FIG. 2. Fuel tank 16 stores fuel to be burned in engine 100 to propel vehicle 12. Fill tube 13 is fluidly coupled to fuel tank 16 and is used to conduct fuel to fuel tank 16 during refueling. Fuel vapor control system 110 is configured to allow for venting of pressurized fuel-laden vapor from fuel tank 16 when relatively high pressure is developed in fuel tank 16 and to capture hydrocarbons entrained in fuel-laden vapor during venting. Fuel vapor control system 110 is further configured to release captured hydrocarbons into atmospheric air pulled into fuel vapor control system 110 during operation of engine 100 so that the hydrocarbons can be burned along with other fuel in engine 100.

Figure 5:
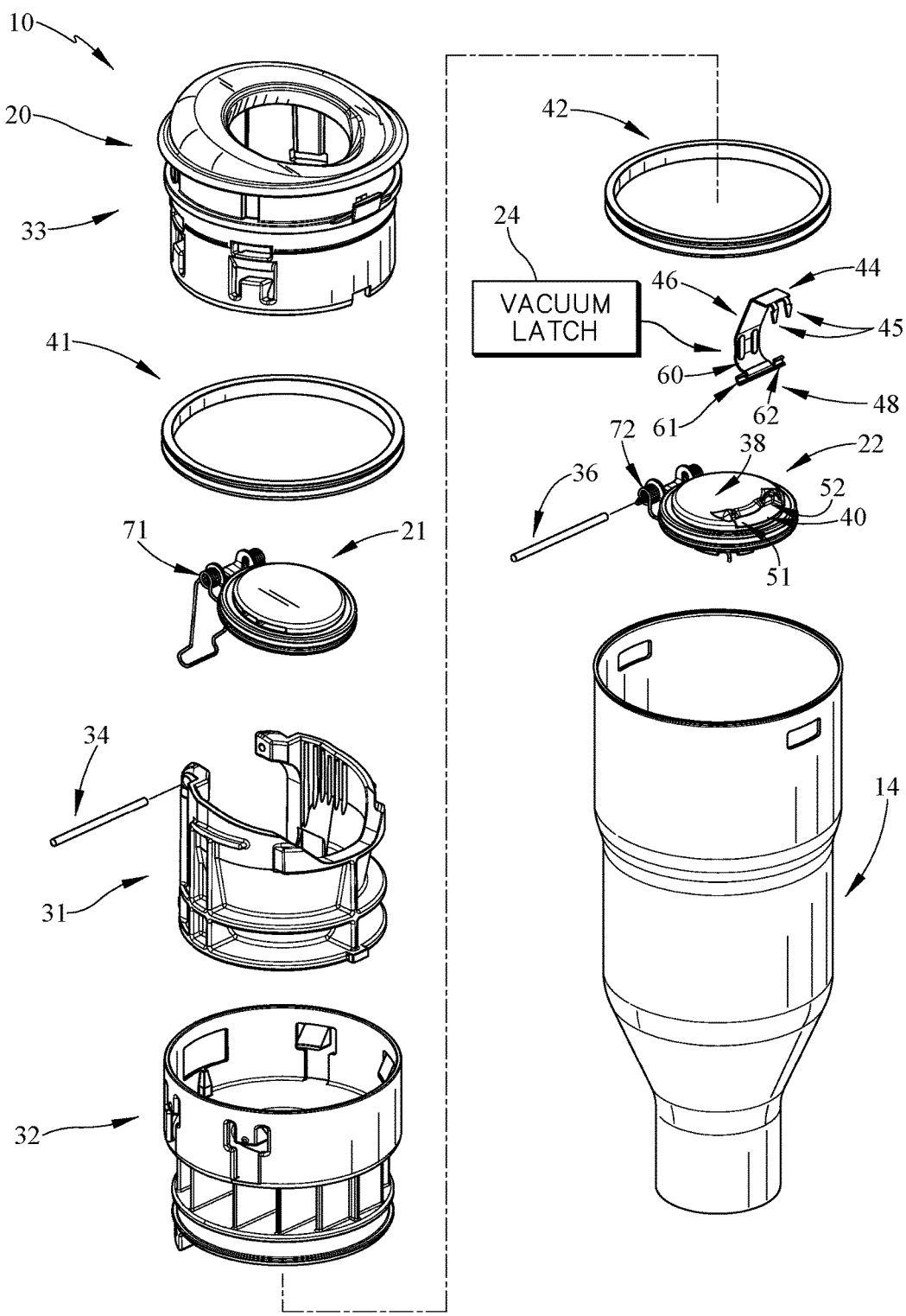
FIG. 5 is an exploded perspective assembly view of the fill tube of FIG. 3 showing that the vacuum latch includes a connector portion formed to have tabs that are received in corresponding slots formed in the nozzle-receiving housing, a release portion that extends inwardly in a radial direction from the connector portion toward a central axis of the fill tube, and an engagement portion that extends from the release portion to engage a catch included in the inner closure door so that the inner closure door is blocked from opening under vacuum pressure that may be applied by a fuel vapor control system onto the inner closure door but is free to open upon insertion of a fuel-dispensing pump nozzle into the nozzle-receiving housing and into contact with the release portion of the vacuum latch.

Filler neck closure assembly 10 of the exemplary embodiment is a capless closure adapted to close off filler neck 14 from atmosphere 101 except during refueling as suggested in FIGS. 1-8. Filler neck closure assembly 10 includes nozzle-receiving housing 20, outer dust cover 21, inner closure door 22, and vacuum latch 24 as shown in FIG. 5. Nozzle-receiving housing 20 is shaped to be inserted into filler neck 14 and to provide a nozzle-receiving passageway 25. Outer dust cover 21 selectively blocks entry into nozzle-receiving passageway 25 and is coupled to housing 20 to pivot from a closed position to an opened position as suggested in FIG. 6. Outer dust cover 21 is normally biased toward the closed position by a spring 71. Inner closure door 22 selectively blocks fluid communication between nozzle-receiving passageway 25 and filler neck 14. Inner closure door 22 is normally biased toward a closed position by a spring 72.

Nozzle-receiving housing 20 is illustratively made up of an outer nozzle receiver 31, an inner nozzle receiver 32, and a cover 33 as shown in FIG. 5. Outer nozzle receiver 31 supports outer dust cover 21 for movement about pin 34. Inner nozzle receiver 32 supports inner closure door 22 for movement about pin 36. Cover 33 is mounted to outer nozzle receiver 31 and extends outwardly to cover an outer surface of filler neck 14. Seals 41, 42 are received in grooves formed in housing 20 and seal between nozzle-receiving housing 20 and filler neck 14 as shown in FIG. 3.

Inner closure door 22 shown includes a closure flap 38 and a catch 40 as shown in FIG. 5. Closure flap 38 is configured to block fluid communication between nozzle-receiving passageway 25 and filler neck 14 when inner closure door 22 is closed. Catch 40 is adapted to be engaged by latch 24 when latch 24 blocks movement of closure door 22 to the opened position. Catch 40 illustratively forms two spaced apart pockets 51, 52 that receive vacuum latch 24 when vacuum latch 24 is in the locked configuration as shown in FIG. 4.

Figure 6:
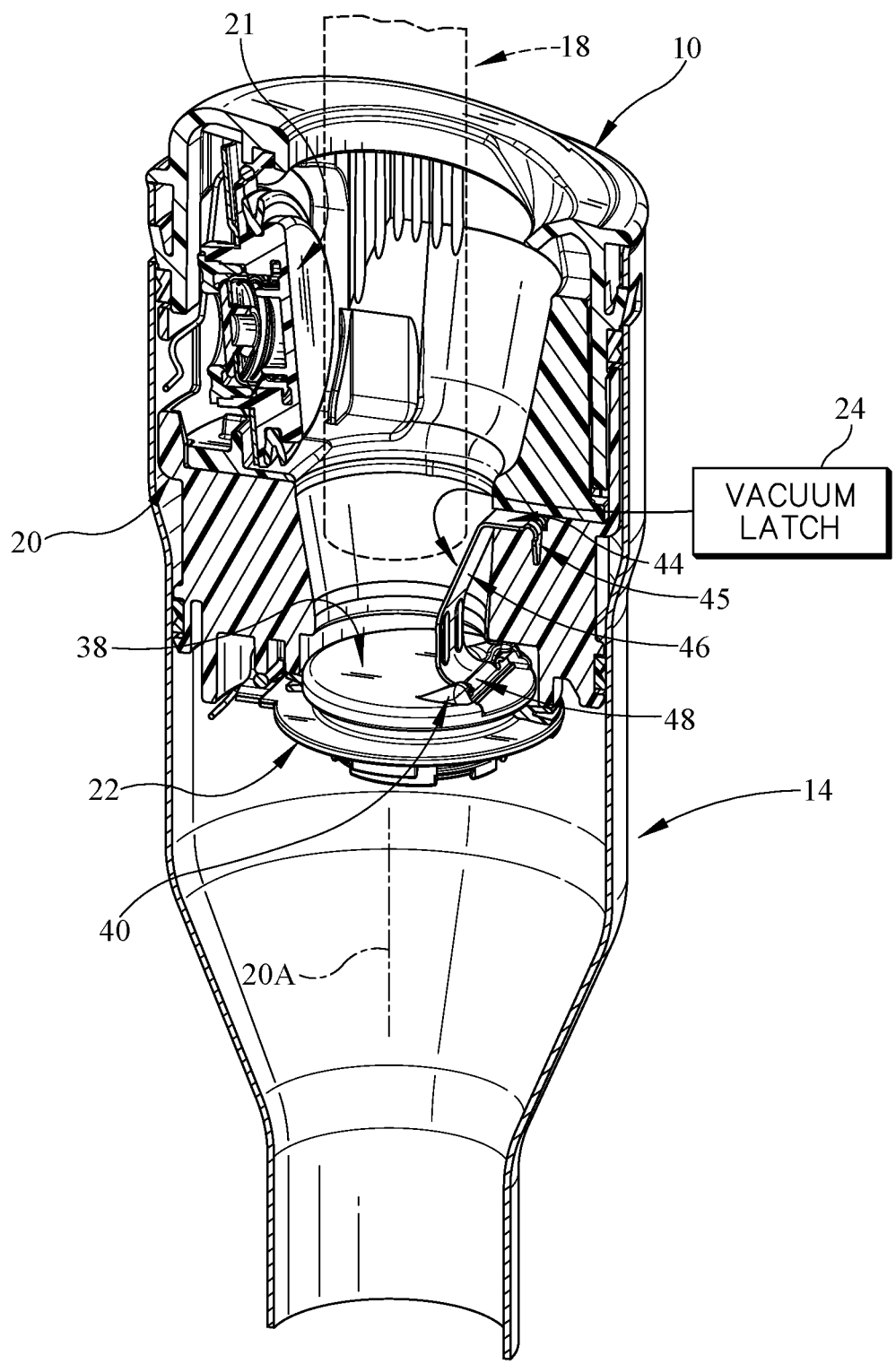
FIG. 6 is a perspective view of the fill tube of FIGS. 3-5 showing a fuel-dispensing pump nozzle inserted a first distance into the nozzle-receiving housing to move the outer dust cover from a closed position to a opened position.
Figure 7:
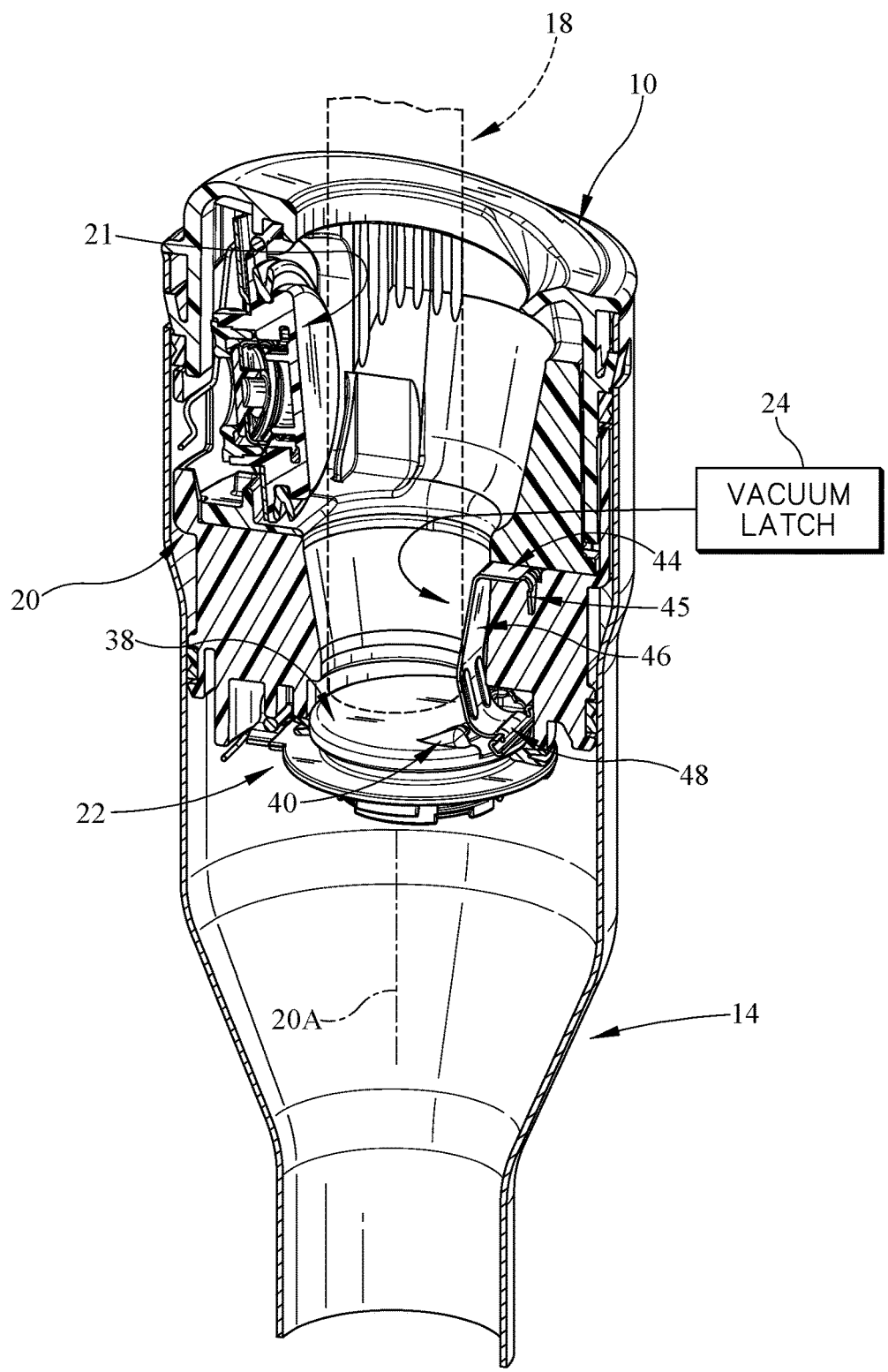
FIG. 7 is a view similar to FIG. 6 showing the fuel-dispensing nozzle inserted a second distance, greater than the first distance shown in FIG. 6, into the nozzle-receiving housing to contact the release portion of the vacuum latch to move the vacuum latch from a locked configuration blocking the inner closure door from opening to an unlocked configuration allowing the inner closure door to open as shown in FIG. 8.
Figure 8:
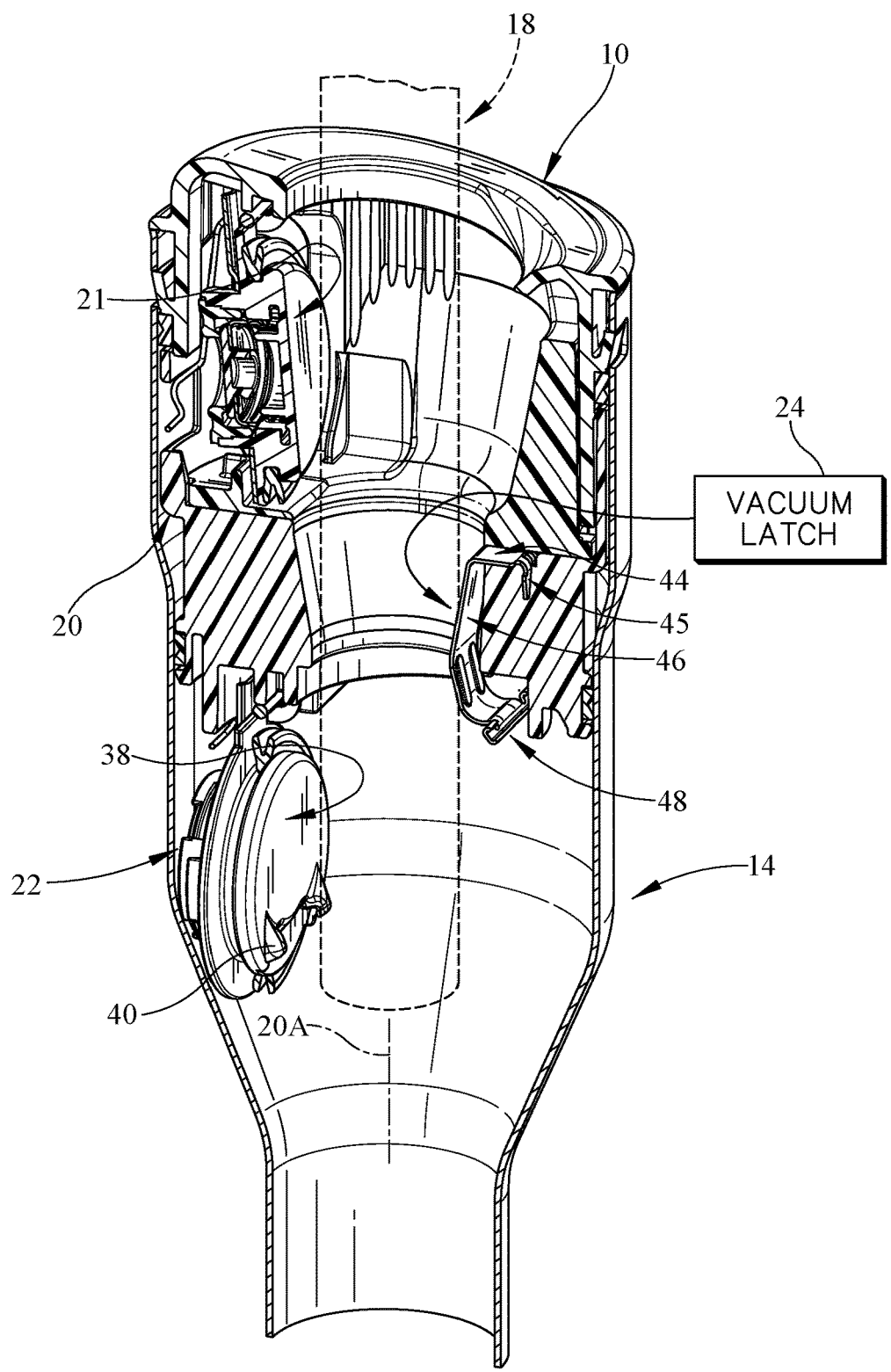
FIG. 8 is a view similar to FIGS. 6 and 7 showing the fuel-dispensing nozzle inserted a third distance, greater than the first and second distances shown in FIGS. 6 and 7, into the nozzle receiving housing to move the inner closure door from a closed position to an opened position so that fuel dispensed from the fuel-dispensing nozzle is discharged into the filler neck and subsequently carried to a fuel tank.

Vacuum latch 24 illustratively comprises a deformable metallic material and is movable from a normally locked configuration to an unlocked configuration upon contact with fuel-dispensing fuel nozzle 18 as suggested in FIGS. 6-8. In the locked configuration, vacuum latch 24 engages catch 40 of inner closure door 22 to block movement of inner closure door 22 to the opened position. In the unlocked configuration, vacuum latch 24 disengages catch 40 of inner closure door 22 to allow movement of inner closure door 22 to the opened position.

Vacuum latch 24 provides means for engaging inner closure door 22 to block movement of inner closure door 22 from the closed position to the opened position between refueling events when no fuel nozzle 18 is inserted into nozzle-receiving passageway 25 so that inner closure door 22 does not move to the opened position in response to the application of vacuum pressure from within the associated vehicle fuel tank 16. Vacuum latch 24 further provides means for disengaging inner closure door 22 to allow movement of inner closure door 22 from the closed position to the opened position during refueling events when a fuel nozzle 18 is inserted into nozzle-receiving passageway 25 so that inner closure door 22 does not block insertion of fuel nozzle 18 into filler neck 14 to discharge liquid fuel into filler neck 14 and the associated vehicle fuel tank 16.

Vacuum latch 24 illustratively includes a connector portion 44 formed to have tabs 45, a release portion 46, and an engagement portion 48 as shown in FIGS. 4 and 5. Connector portion 44 is received in slots 48 formed in nozzle-receiving housing 20 to couple vacuum latch 24 to housing 20. Release portion 46 extends inwardly in a radial direction toward a central axis 20A of nozzle-receiving housing 20 and in an axial direction along central axis 20A of nozzle-receiving housing 20 from the connector portion 44 to the engagement portion 48. Release portion 46 is arranged to be contacted by fuel-dispensing pump nozzle 18 when it is inserted into nozzle-receiving housing 20 past outer dust cover 21 as shown in FIG. 7. Engagement portion 48 extends from release portion 46 to engage catch 40 included in inner closure door 22 so that inner closure door 22 is blocked from opening under vacuum pressure that may be applied by fuel vapor control system 110 onto inner closure door 22. Engagement portion 48 disengages catch 40 upon insertion of fuel-dispensing pump nozzle 22 into nozzle-receiving housing 20 into contact with release portion 46 of vacuum latch 24 so that further insertion of fuel-dispensing pump nozzle 22 opens inner closure door 22 as shown in FIG. 8.

Engagement portion 48 of vacuum latch 24 is illustratively T-shaped as shown in FIG. 4. Engagement portion 48 includes a stem 60 and arms 61, 62 that extend in opposite directions from stem 60. Arms 61, 62 of engagement portion 48 are received in corresponding pockets 51, 52 of catch 40 when vacuum latch 24 is in the locked configuration.

Fuel vapor control system 110 illustratively includes fuel vapor recovery canister 112, a fuel tank isolation valve 114, an air filter 116, and a purge valve 118 as shown in FIG. 2. Fuel vapor recovery canister 112 houses carbon bed 115 and is coupled to fuel tank isolation valve 114 to receive fuel vapor from fuel tank 16 when valve 114 is opened. Fuel tank isolation valve 114 is coupled to fuel tank 16 and may be closed to isolate fuel tank 16 such as, for example, when vehicle 12 is powered by a battery and engine 100 is not in use. Fuel tank isolation valve 114 is also coupled to atmosphere 101 via air filter 116. Purge valve 118 is arranged between fuel vapor recovery canister 112 and engine 100 to regulate flow into engine 100 during transmission of hydrocarbons from fuel vapor recovery canister 112 into engine 100.

Closure 10 with vacuum latch 24 of the present disclosure is adapted to block air ingress into the fuel tank when a vacuum pressure forms within the tank, allowing the vacuum to eventually be balanced by a separate auxiliary valve pulling air through a canister and into the tank as needed.

According to aspects of the present disclosure, the upper housing of a capless filler head uses an assembled metal bracket, sometimes called vacuum latch 24, that latches onto the filler door, sometimes called an inner closure door 22, to keep it closed until pushed to the side upon insertion of the nozzle 18 during fuel fill process. The bracket or vacuum latch 24 acts as a lever and upon being pushed to the side unhooks the door 22 to allow fill. Upon pulling out the nozzle 18 the door 22 closes and the lever bracket 26 re-latches the door 22. The bracket 24 is designed as a stainless steel spring cantilever. Cantilever bracket spring lever 26 is inserted into the housing 20 as a snap in fit and also trapped by upper door assembly. No gluing or welding or separable mechanical mounting necessary. Stainless steel cantilever design does not require separable springs and plastic molded latching mechanisms. Allows the door to remain closed under vacuum conditions so the FTIV can open and perform the vacuum balance as needed through the canister.

The invention claimed is:

1. A capless filler neck closure assembly adapted for use with a filler neck associated with a vehicle fuel tank, the assembly comprising
    a nozzle-receiving housing that defines nozzle-receiving passageway sized to receive the tip of a fuel-dispensing pump nozzle therein during refueling of the vehicle fuel tank,
    an outer dust shield mounted to pivot relative to the nozzle-receiving housing from a normally closed position arranged to block dirt from entering the nozzle-receiving passageway of the nozzle-receiving housing to an opened position arranged to allow a fuel nozzle to enter the nozzle-receiving passageway of the nozzle-receiving housing,
    an inner closure door mounted to pivot relative to the nozzle-receiving housing from a normally closed position arranged to block fluid communication between the nozzle-receiving passageway and the filler neck when the capless filler neck closure assembly is coupled to the filler neck to an opened position arranged to allow fluid communication between the nozzle-receiving passageway and the filler neck when the capless filler neck closure assembly is coupled to the filler neck, and
    a vacuum latch movable from a normally locked configuration arranged to block opening of the inner closure door, to an unlocked configuration arranged to allow opening of the inner closure door, wherein the vacuum latch is a singular component located in the nozzle-receiving passageway along only a portion of the diameter of the nozzle-receiving passageway and is arranged to be engaged by a fuel nozzle when the fuel nozzle is inserted into the nozzle-receiving passageway past the outer dust shield but before the fuel nozzle contacts the inner closure door, and the vacuum latch comprises a deformable material configured to elastically deform from the normally locked configuration to the unlocked configuration in response to engagement by the fuel nozzle when the fuel nozzle is inserted into the nozzle-receiving passageway past the outer dust shield but before the fuel nozzle contacts the inner closure door.

2. The assembly of claim 1, wherein the vacuum latch includes a connector portion fixed to the nozzle-receiving housing, an engagement portion that is configured to engage the inner closure door when the vacuum latch is in the normally locked configuration to block movement of the closure door, and a release portion that extends inward in a radial direction toward a central axis of the nozzle-receiving housing and in an axial direction along the central axis of the nozzle-receiving housing from the connector portion to the engagement portion, and wherein the release portion is arranged to be engaged by a fuel nozzle when the fuel nozzle is inserted into the nozzle-receiving passageway past the outer dust shield but before the fuel nozzle contacts the inner closure door.

3. The assembly of claim 1, wherein the inner closure door includes a closure flap configured to block communication from the nozzle-receiving passageway to the filler neck when the inner closure door is in the normally closed position and a catch that is configured to be engaged by the vacuum latch when the fuel nozzle is not inserted into the nozzle-receiving passageway.

4. The assembly of claim 3, wherein the catch defines a pocket that receives at least a portion of the vacuum latch when the inner closure door is in the normally closed position and when the fuel nozzle is not inserted into the nozzle-receiving passageway.

5. The assembly of claim 4, wherein the vacuum latch includes a connector portion fixed to the nozzle-receiving housing and an engagement portion that is received in the pocket of the catch to block movement of the closure door when the inner closure door is in the normally closed position and when the fuel nozzle is not inserted into the nozzle-receiving passageway, and the engagement portion is configured to move out of the pocket of the catch to allow movement of the closure door when the fuel nozzle is inserted into the nozzle-receiving passageway.

6. The assembly of claim 5, wherein the vacuum latch includes a release portion that extends inward in a radial direction toward a central axis of the nozzle-receiving housing and in an axial direction along the central axis of the nozzle-receiving housing from the connector portion to the engagement portion, and the release portion is arranged to be engaged by a fuel nozzle when the fuel nozzle is inserted into the nozzle-receiving passageway past the outer dust shield but before the fuel nozzle contacts the inner closure door.

7. A capless filler neck closure assembly adapted for use with a filler neck associated with a vehicle fuel tank, the assembly comprising
    a nozzle-receiving housing that defines nozzle-receiving passageway sized to receive the tip of a fuel-dispensing pump nozzle therein during refueling of the vehicle fuel tank, an outer dust shield mounted to pivot relative to the nozzle-receiving housing from a normally closed position arranged to block dirt from entering the nozzle-receiving passageway of the nozzle-receiving housing to an opened position arranged to allow a fuel nozzle to enter the nozzle-receiving passageway of the nozzle-receiving housing, an inner closure door mounted to pivot relative to the nozzle-receiving housing from a normally closed position arranged to block fluid communication between the nozzle-receiving passageway and the filler neck when the capless filler neck closure assembly is coupled to the filler neck to an opened position arranged to allow fluid communication between the nozzle-receiving passageway and the filler neck when the capless filler neck closure assembly is coupled to the filler neck, and a vacuum latch movable from a normally locked configuration arranged to block opening of the inner closure door to an unlocked configuration arranged to allow opening of the inner closure door, the vacuum latch configured to move from the normally locked configuration to the unlocked configuration in response to insertion of a fuel nozzle into the nozzle-receiving passageway past the outer dust shield while still out of contact with the inner closure door, wherein the vacuum latch includes a connector portion fixed to the nozzle-receiving housing and an engagement portion that blocks movement of the closure door when the vacuum latch is in the normally locked configuration and the inner closure door is in the normally closed position, the inner closure door includes a closure flap configured to block fluid communication out of the nozzle-receiving passageway when the inner closure door is in the normally closed position and a catch configured to be engaged by the engagement portion of the vacuum latch when the vacuum latch is in the normally locked configuration and the inner closure door is in the closed position, and the engagement portion of the vacuum latch has a T-shape including a stem and arms extending in opposite directions from the stem and each arm is received in a corresponding pocket included in the catch of the inner closure door.

8. The assembly of claim 7, wherein the vacuum latch includes a release portion that extends inward in a radial direction toward a central axis of the nozzle-receiving housing and in an axial direction along the central axis of the nozzle-receiving housing from the connector portion to the engagement portion, and the release portion is arranged to be engaged by the fuel nozzle when the fuel nozzle is inserted into the nozzle-receiving passageway past the outer dust shield.

9. The assembly of claim 8, wherein the vacuum latch comprises a deformable material configured to elastically deform from the normally locked configuration to the unlocked configuration.

10. The assembly of claim 8, wherein the engagement portion of the vacuum latch and the release portion of the vacuum latch are cantilevered from the connector portion of the vacuum latch.

11. The assembly of claim 7, wherein the catch is formed to define two spaced apart pockets that receives the engagement portion of the vacuum latch when the vacuum latch is in the normally locked configuration.

12. A hybrid vehicle configured to be powered by an internal combustion engine or a battery, the hybrid vehicle comprising
a fuel tank,
an internal combustion engine,
a fuel vapor control system configured to allow for venting of pressurized fuel-laden vapor from fuel tank when pressure is developed in fuel tank and to capture hydrocarbons entrained in fuel-laden vapor during venting, the fuel vapor control system including a fuel tank isolation valve coupled to fuel tank and configured to be closed to isolate fuel tank such that pressure or vacuum may be developed in the fuel tank, and
a capless filler neck closure assembly coupled to the fuel tank via a filler neck, the capless filler neck closure assembly including
a nozzle-receiving housing that defines nozzle-receiving passageway sized to receive the tip of a fuel-dispensing pump nozzle therein during refueling of the vehicle fuel tank,
an outer dust shield mounted to pivot relative to the nozzle-receiving housing from a normally closed position arranged to block dirt from entering the nozzle-receiving passageway of the nozzle-receiving housing to an opened position arranged to allow a fuel nozzle to enter the nozzle-receiving passageway of the nozzle-receiving housing,
an inner closure door mounted to pivot relative to the nozzle-receiving housing from a normally closed position arranged to block fluid communication between the nozzle-receiving passageway and the filler neck when the capless filler neck closure assembly is coupled to the filler neck to an opened position arranged to allow fluid communication between the nozzle-receiving passageway and the filler neck when the capless filler neck closure assembly is coupled to the filler neck, and
a vacuum latch movable from a normally locked configuration arranged to block opening of the inner closure door to an unlocked configuration arranged to allow opening of the inner closure door, the vacuum latch configured to move from the normally locked configuration to the unlocked configuration in response to insertion of a fuel nozzle into the nozzle-receiving passageway past the outer dust shield while still out of contact with the inner closure door.

13. The hybrid vehicle of claim 12, wherein the fuel tank isolation valve is configured to isolate the fuel tank during at least some times when the vehicle is powered by the battery and the internal combustion engine is not in use.

14. The hybrid vehicle of claim 12, wherein the vacuum latch is a singular component located in the nozzle-receiving passageway along only a portion of the diameter of the nozzle-receiving passageway and is arranged to be engaged by a fuel nozzle when the fuel nozzle is inserted into the nozzle-receiving passageway past the outer dust shield but before the fuel nozzle contacts the inner closure door.

15. The hybrid vehicle of claim 14, wherein the vacuum latch comprises a deformable material configured to elastically deform from the normally locked configuration to the unlocked configuration.

16. The hybrid vehicle of claim 12, wherein the vacuum latch comprises a deformable material configured to elastically deform from the normally locked configuration to the unlocked configuration in response to engagement by the fuel nozzle when the fuel nozzle is inserted into the nozzle-receiving passageway past the outer dust shield but before the fuel nozzle contacts the inner closure door.

17. The hybrid vehicle of claim 12, wherein the vacuum latch includes a connector portion fixed to the nozzle-receiving housing and an engagement portion that blocks movement of the closure door when the vacuum latch is in the normally locked configuration and the inner closure door is in the normally closed position, the inner closure door includes a closure flap configured to block fluid communication out of the nozzle-receiving passageway when the inner closure door is in the normally closed position and a catch configured to be engaged by the engagement portion of the vacuum latch when the vacuum latch is in the normally locked configuration and the inner closure door is in the closed position, and the engagement portion of the vacuum latch has a T-shape including a stem and arms extending in opposite directions from the stem and each arm is received in a corresponding pocket included in the catch of the inner closure door.

18. The hybrid vehicle of claim 12, wherein the fuel vapor control system includes a fuel vapor recovery canister with a carbon bed and the fuel vapor recovery canister is coupled to the fuel tank isolation valve.

19. The hybrid vehicle of claim 18, wherein the fuel tank isolation valve is further coupled to atmosphere.

* * * * *